(12) United States Patent
Shiohara

(10) Patent No.: US 9,557,947 B2
(45) Date of Patent: Jan. 31, 2017

(54) CONTROLLING CHANGING OF PRINT SETTING FOR STRUCTURED DOCUMENT

(71) Applicant: CANON KABUSHIKI KAISHA, Tokyo (JP)

(72) Inventor: Tetsuya Shiohara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 364 days.

(21) Appl. No.: 14/158,173

(22) Filed: Jan. 17, 2014

(65) Prior Publication Data

US 2014/0136974 A1 May 15, 2014

Related U.S. Application Data

(63) Continuation of application No. 12/619,659, filed on Nov. 16, 2009, now Pat. No. 8,634,102.

(30) Foreign Application Priority Data

Dec. 15, 2008 (JP) .................................. 2008-318941

(51) Int. Cl.
G06F 3/12 (2006.01)

(52) U.S. Cl.
CPC ........... *G06F 3/1256* (2013.01); *G06F 3/1203* (2013.01); *G06F 3/1246* (2013.01); *G06F 3/1253* (2013.01)

(58) Field of Classification Search
CPC .................................................. G06F 3/1256
USPC ................................ 358/1.15, 1.18; 715/274
See application file for complete search history.

(56) References Cited

U.S. PATENT DOCUMENTS

| 7,453,595 | B2 | 11/2008 | Natori |
| 8,300,238 | B2 | 10/2012 | Kato |
| 2003/0103221 | A1 | 6/2003 | Natori |
| 2004/0107855 | A1 | 6/2004 | Kizaki et al. |
| 2004/0111675 | A1 | 6/2004 | Mori et al. |
| 2005/0286100 | A1 | 12/2005 | Uotani et al. |
| 2006/0232811 | A1* | 10/2006 | Yokoyama ........... G06K 15/005 358/1.14 |
| 2006/0256360 | A1* | 11/2006 | Kayama ................ G06F 3/1208 358/1.13 |

(Continued)

FOREIGN PATENT DOCUMENTS

| JP | 2003-167721 A | 6/2003 |
| JP | 2004-102618 A | 4/2004 |

(Continued)

*Primary Examiner* — Jacky X Zheng

(74) *Attorney, Agent, or Firm* — Fitzpatrick, Cella, Harper & Scinto

(57) ABSTRACT

Whether all pages have the same print settings is determined before print settings are changed in a print preview, and the setting change is permitted only when all pages have the same print settings. In each layer of XPS data to be processed, whether the print setting information is not added to the element of the layer or whether the print setting information added to the element of the layer is shared by all elements of the layer is determined. A change in the print setting information by the user is accepted if one of the conditions is satisfied. When the print settings are changed, the setting change is not reflected on individual print tickets. The change is reflected on the entire job by adding a print ticket reflected with the setting change on the top element.

10 Claims, 15 Drawing Sheets

(56) References Cited

U.S. PATENT DOCUMENTS

| | | | |
|---|---|---|---|
| 2007/0216944 A1* | 9/2007 | Furuya | G06F 3/1212 358/1.15 |
| 2008/0151294 A1 | 6/2008 | Natori et al. | |
| 2010/0027043 A1 | 2/2010 | Kato | |

FOREIGN PATENT DOCUMENTS

| | | |
|---|---|---|
| JP | 2006-11847 A | 1/2006 |
| JP | 2008-186254 A | 8/2008 |
| JP | 2008-242661 A | 10/2008 |
| JP | 2008-271098 A | 11/2008 |

\* cited by examiner

FIG. 16

```
<?xml version="1.0" encoding="UTF-8"?>
<psf:PrintTicket
  xmlns:psf="http://schemas.microsoft.com/windows/2003/08/printing/printschemaframework"
  xmlns:psk="http://schemas.microsoft.com/windows/2003/08/printing/printschemakeywords"
  xmlns:xsi="http://www.w3.org/2001/XMLSchema-instance"
  xmlns:xsd="http://www.w3.org/2001/XMLSchema" version="1">
  <psf:Feature name="psk:PageMediaSize">
    <psf:Option name="psk:ISOA4">
      <psf:ScoredProperty name="psk:MediaSizeWidth">
        <psf:Value xsi:type="xsd:integer">210000</psf:Value>
      </psf:ScoredProperty>
      <psf:ScoredProperty name="psk:MediaSizeHeight">
        <psf:Value xsi:type="xsd:integer">297000</psf:Value>
      </psf:ScoredProperty>
    </psf:Option>
  </psf:Feature>                                                    }1601
  <psf:Feature name="psk:PageMediaType">
    <psf:Option name="psk:Plain"/>                                  }1602
  </psf:Feature>
  <psf:Feature name="psk:PageOrientation">
    <psf:Option name="psk:Portrait"/>
  </psf:Feature>
  <psf:Feature name="psk:PageOutputColor">
    <psf:Option name="psk:Color"/>
  </psf:Feature>
</psf:PrintTicket>
```

FIG. 17

|  | USER DEFAULT | FDS | FD | FP | PAGE LEVEL PT |
|---|---|---|---|---|---|
| PAPER SIZE | A4 |  |  |  | A4 |
| PAPER TYPE | STANDARD PAPER | STANDARD PAPER | POSTCARD |  | POSTCARD |
| FEEDING METHOD | CASSETTE | CASSETTE |  |  | CASSETTE |
| PRINT ORIENTATION | VERTICAL |  |  | HORIZONTAL | HORIZONTAL |
| MONOCHROME PRINTING | ON | ON | OFF | ON | ON |

CONTROLLING CHANGING OF PRINT SETTING FOR STRUCTURED DOCUMENT

This application is a continuation of U.S. application Ser. No. 12/619,659, filed Nov. 16, 2009 (pending), the contents of which are incorporated herein by reference.

BACKGROUND OF THE INVENTION

Field of the Invention

The present invention relates to a document processing apparatus and a document processing method having a so-called preview function, or the like, for displaying a printing image to allow the user to recognize the printing image before print processing.

Description of the Related Art

In a print system using a computer with Windows (registered trademark) of Microsoft Corporation installed as an operating system (OS), print data generated by an application program (application), and the like, is stored in a spool file in an OS-standard data format. The OS invokes a printer driver to print the print data. The printer driver reads the print data stored in the spool file, an image generation processing unit creates a printing image, and a printer further converts the data into a print command that can be interpreted. The print command is transmitted to the printer, and the printer interprets the print command and forms an image on a recording medium to execute print processing.

In the printer driver, a print preview function is realized in which print data and print settings are analyzed before the print command is transmitted to the printer to create display data indicating the print result, and the data is displayed in advance. The preview function is provided as a module of the printer driver. A function is also included in which the preview function outputs the content drawn by a rendering module of the printer driver or a drawing module of the OS on the display unit, the content serving as a print preview (see, for example, Japanese Patent Laid-Open No. 2003-167721 or Japanese Patent Laid-Open No. 2004-102618). The print preview function also realizes a function of displaying the print settings and making a change as necessary (see, for example, Japanese Patent Laid-Open No. 2006-011847).

Meanwhile, a print system different from the conventional print system has been emerged in recent years. In the new print system (will be called "XPS print system"), not a conventional EMF format (Enhanced Meta File), but an XPS format (XML Paper Specification) is used as a data format stored in the spool file. The XPS is an open-standard electronic document format developed by Microsoft Corporation.

To facilitate the user to recognize the extent of the impact of changes when the print settings are changed in the print preview, a method is used in some cases in which the target of the print setting change is limited to a job in which all pages in the job have the same print settings, and the change is reflected on the entire job. In that case, whether all pages in the job have the same print settings needs to be determined. In the XPS print system, a print ticket (PrintTicket or PT) that is XML data describing the print settings can be prepared for a part of the job such as a page. Therefore, the print tickets need to be compared to determine whether the print settings are the same in the pages of the document data in XPS format.

However, when the items described in the print tickets are individually compared, a large process load may be imposed depending on the number of pages or the number of items described in the print tickets. Furthermore, to reflect changes on the print tickets after the print settings are changed, the print tickets need to be updated to reflect the changes on all pages.

SUMMARY OF THE INVENTION

The present invention has been made in view of the foregoing problems, and the present invention provides a document processing apparatus and a document processing method for minimizing the process load of comparisons or updates of print settings to limit the target of print setting change to a job in which all pages in the job have the same print settings.

The present invention is configured as follows. More specifically, according to an aspect of the invention, a document processing apparatus that handles a structural document comprised of elements of a hierarchical structure, including at least one page element described with drawing information, and in which print setting information can be added to each element of each layer, the document processing apparatus comprises: a print setting determination unit configured to determine, in each layer of a structural document to be processed, whether the print setting information is not added to the element of the layer or whether the print setting information added to the element of the layer is shared by all elements of the layer; and a print setting information editor configured to accept a change in the print setting information by the user if the print setting determination unit determines, in each layer of the structural document to be processed, that the print setting information is not added to the element of the layer or determines that the print setting information added to the element of the layer is common in all elements of the layer.

According to the configurations, the present invention can quickly determine, with a low process load, whether all pages have the same print settings in a print job.

Furthermore, the present invention can reflect the changes in the print settings on the entire XPS data while reducing the amount of updates of PrintTicket.

Further features of the present invention will become apparent from the following description of exemplary embodiments with reference to the attached drawings.

BRIEF DESCRIPTION OF THE DRAWINGS

FIG. 16 is a schematic diagram of an example of a PT.

FIG. 17 is a diagram showing an example of a merge result of the PT.

DESCRIPTION OF THE EMBODIMENTS

First Embodiment

Figure 1:
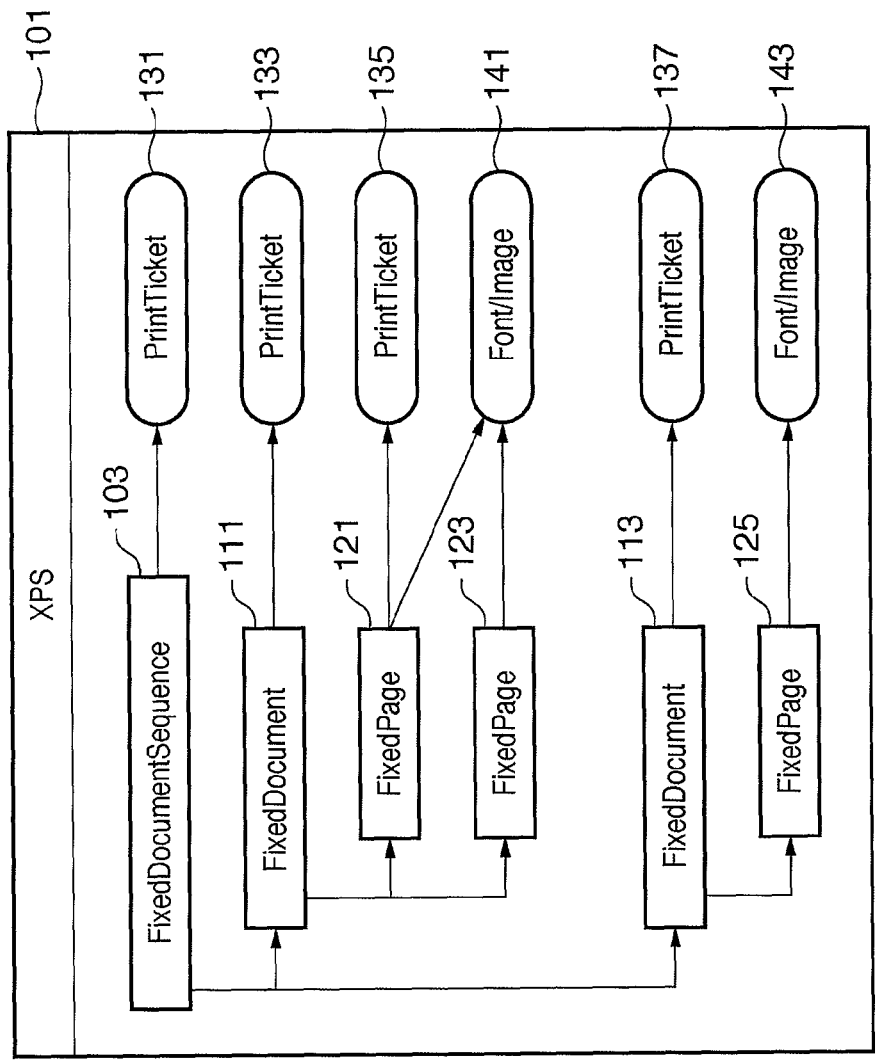
FIG. 1 is a schematic diagram of a logical structure of an XPS.

The present invention will now be described in detail based on embodiments illustrated in the drawings. An XPS in the specification is an abbreviation of XML Paper Specification and is one of open-standard electronic document formats developed by Microsoft Corporation.

<Configuration of XPS Document>

The XPS will be simply described first to facilitate the understanding of the specification. An XPS document has a hierarchical structure and is a structural document including elements on each layer. Specifically, the XPS document has a tree structure in which FixedDocumentSequence (hereinafter, "FDS" or "job element") is the route or the top layer. The FDS has one or more FixedDocument (hereinafter "FD" or "document element"), and the FD has one or more FixedPage (hereinafter, "FP" or "page element"). Therefore, the lower layers belong to the top layer. The FDS, the FD, and the FP will be called XPS parts in some cases and will also be called elements of the XPS parts in some cases. The FP describes the content of pages of a document in XML format and includes the content that will be actually displayed or printed. In other words, the FP describes drawing information. A plurality of FPs can share the resources, such as fonts and images, used in the page content of the FPs. The FDS, the FD, and the FP can have print settings in print tickets (hereinafter, "PT"). Thus, the print tickets are equivalent to print setting information added to the elements. The PTs describe print settings for printing an XPS document in XML format. The print settings used to print the FPs are PTs in which the PTs of the FDS, the PTs of the parent FD of the FP to be printed, and the PTs of the FP to be printed are merged. When the PTs are merged, the print settings of lower layers are prioritized. In document data in XPS format, the FP is equivalent to a page of the document, the FD is equivalent to a document with bundled pages, and the FDS is equivalent to a job with bundled documents. The job is equivalent to a group of document data.

FIG. 1 is an example of a block diagram showing a logical structure of an XPS document. The logical structure of an XPS document 101 is a tree structure in which an FDS 103 is a route. The FDS 103 includes FDs 111 and 113 as children. The FD 111 includes FPs 121 and 123 as children. The FD 113 includes an FP 125 as a child. In relation to the PTs describing the print settings, the FDS 103 holds a PT 131, the FD 111 holds a PT 133, the FP 121 holds a PT 135, and the FD 113 holds a PT 137. In other words, holding a PT indicates an association. The FPs 123 and 125 do not hold the PT. The FPs 121 and 123 share resources 141, such as fonts and images, and the FP 125 uses resources 143, such as fonts and images. For example, the PT used to print the FP 121 is a PT in which the PTs 131, 133, and 135 are merged. The actual XPS document is data obtained by compressing the structural document of FIG. 1.

FIG. 16 is an example of a PT. As described, print settings are described in XML. In the PT of FIG. 16, a tag 1601 describes a setting that the paper size is A4, and a tag 1602 describes a print setting that the paper type is standard paper. The PT is attached to the FDS, the FD, and the FP.

FIG. 17 is an example of print settings of an FP generated by merging the PTs. In the example, the print settings include five items, "PAPER SIZE", "PAPER TYPE", "Feeding Method", "Print Orientation", and "Monochrome Printing". The print settings can be designated in the layers of the FDS, the FD, and the FP and are also designated by a default (user default) designated by the user. The FDS and the FD as well as the FD and the FP of FIG. 17 are in serial parent-child relationships. During the merge, the settings of child elements are prioritized and applied in the print settings of the PTs. Default print settings of the user are applied to print settings that do not exist in the PTs of any part. For example, if there is no setting of paper size in the PTs of the FDS, the FD, and the FP as in FIG. 17, a user default setting "A4" is applied as a print setting of the page level. In relation to the paper type, "Standard Paper" is described in the FDS, and "Postcard" is described in the FD. There is no description in the PT of the FP. In this case, rather than the setting of the FDS, the setting of the FD as a child element is applied. Therefore, the paper type "Postcard" is set in the print settings of the page level. Similarly, "Cassette" described in the PT of the FDS is applied to the feeding method, "Horizontal" described in the PT of the FP is applied to the print orientation, and "ON" described in the PT of the FP is applied to the monochrome printing. In this way, among the PTs with relevant print settings, the setting in a lower XPS part in the tree structure is applied as the printing setting of the page level. In which level the setting items will be used is also designated, and before the PTs in parts of the levels lower than the designated level are merged, it is necessary not to take the items into consideration. For example, when the PTs of the FP are merged, the items of the job level described in the PTs of the FP are not reflected. On the other hand, when the PTs of the FDS are merged, the items of the page level described in the PTs of the FDS are reflected.

Hereinafter, a PT obtained by merging a user default print setting and a PT of the FDS will be called a PT of the job level. A PT obtained by merging the PT of the job level and a PT of the FD will be called a PT of the document level. A PT obtained by merging the PT of the document level and a PT of the FP will be called a PT of the page level.

<Configuration of Print System>

Figure 2:
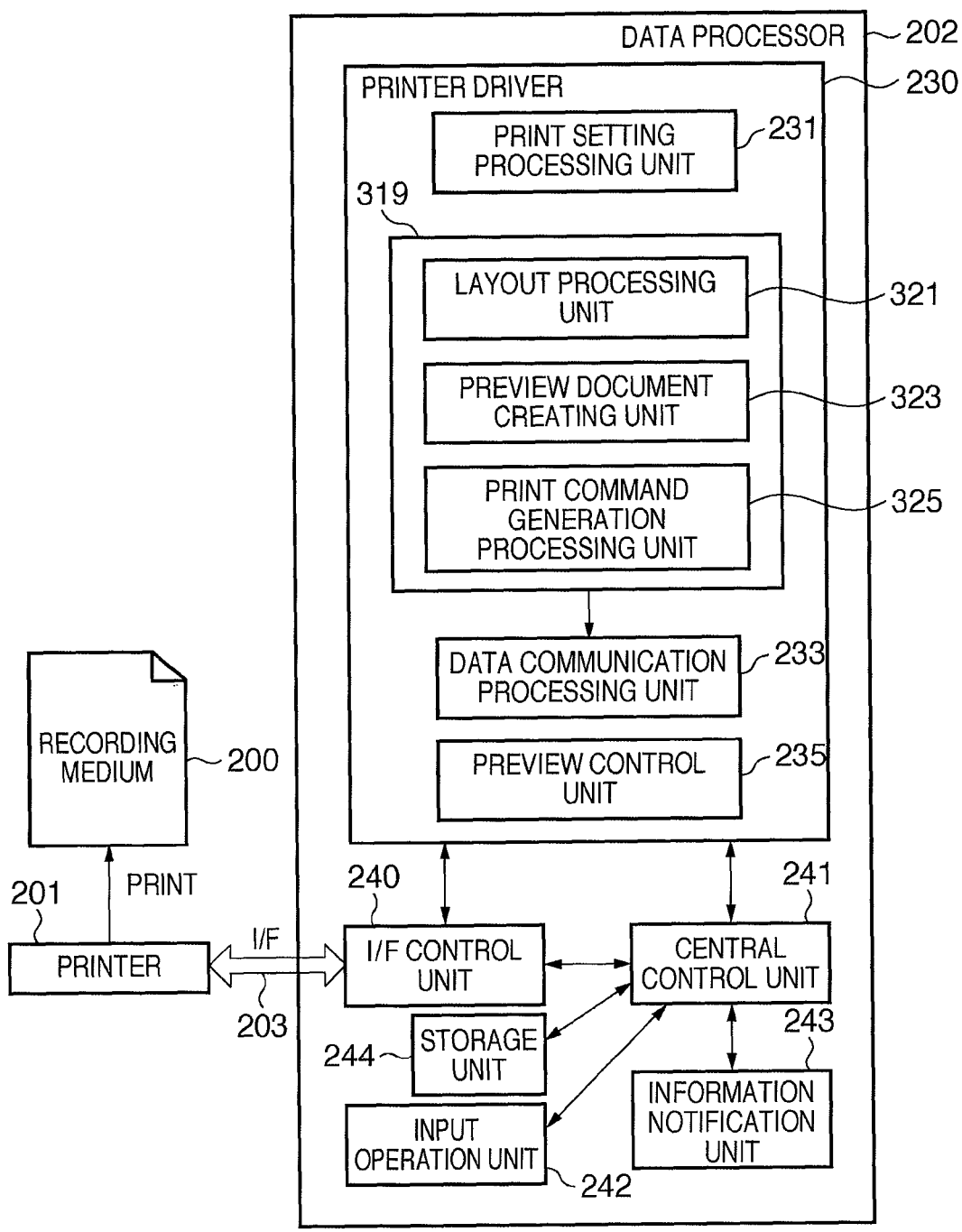
FIG. 2 is a block diagram showing an example of a print system according to an embodiment of the present invention.

FIG. 2 is a block diagram showing a configuration of a print system according to the embodiment of the present invention. A printer 201 is an inkjet printer that forms an image. The printer 201 forms an image on a recording medium 200 based on a print command generated by a data processor (will also be called "information processor") 202 described below. The data processor 202 may be a general-purpose computer installed with a document processing program for executing a procedure of the present embodiment and may also be a document processing apparatus. The type of the printer does not particularly matter, and an inkjet color printer is illustrated herein. In the data processor 202, an application not shown creates a print job, and a printer driver 230 generates a print command for controlling a printing operation of the connected printer 201 based on a spooled print job. In the present embodiment, a personal computer is used as the data processor 202. The data processor 202 also accepts an instruction and input related to the print settings from the user. An OS for controlling the data processor 202 is incorporated into the data processor 202, and various functional blocks are operated under control by the OS. A communication interface 203 is a communication interface for connecting the data processor 202 and the printer 201. A USB as a serial interface is used in the present embodiment. Alternatively, a serial interface, such as IEEE 1394, Ethernet (registered trademark), IrDA, IEEE 802.11, and a power line, or a parallel interface, such as Centronics and SCSI, can be used. Any wired/wireless interface can be used as long as the communications can be realized. In this way, the print system in the present embodiment is not a stand-alone apparatus but has a configuration in which the data processor 202 and the printer 201 that forms an image are connected through a specific two-way interface. However, the arrangement is not limited to this example, and the system may be an integral print system in which the functions of the data processor and the printer are integrated. Functions of the printer 201 and the data processor 202 that are not particularly required to explain the features of the present embodiment will not be described.

Functional blocks will be described. A print setting processing unit 231, also called a user interface module, is a program module for the user to change the print settings. The print setting processing unit 231 can display print setting information according to the operation of the user and accept input, such as an edit, of the print setting information. The print setting processing unit 231 further reflects an accepted change in the print settings on the print setting information. If the print settings cannot be accepted, the print setting processing unit 231 only displays the print settings and does not accept an edit. This can be applied to the entire print setting information, or can be partially applied. A filter group 319 includes a layout processing unit 321, a preview document processing unit 323, and a print command generation processing unit 325. These are program modules which are also called filters. The content of the process will be described with reference to FIG. 3. A data communication processing unit 233 is a program module that outputs a generated print command, or the like. A preview control unit 235, also called a preview control module, performs control related to the preview display, such as generating preview data according to a preview data instruction and displaying a designated page.

Blocks 240 to 244 are hardware modules forming an environment for executing a printer driver 230, an application, an operating system, or the like. A central control unit 241 is a processor that executes a program stored in a storage unit 244, or the like, and that processes document data and print setting information associated with the document data. An information notification unit 243 inputs various signals to the central control unit 241. A display device such as a display can also be included. The storage unit 244 is comprised of a semiconductor memory, a hard disk, or the like, and stores a program as well as document data. The storage unit 244 also stores a spool file used by the operating system for printing. An input operation unit 242 controls input and controls an input device such as a keyboard.

A storage medium supplies program codes of the various functional blocks realized by software. Examples of the medium that can be used include a flexible disk, a hard disk, an optical disk, a magneto-optical disk, a CD-ROM, a CD-R, a magnetic tape, a nonvolatile memory card, and a ROM.

<Operation of Printer Driver>

Figure 3:
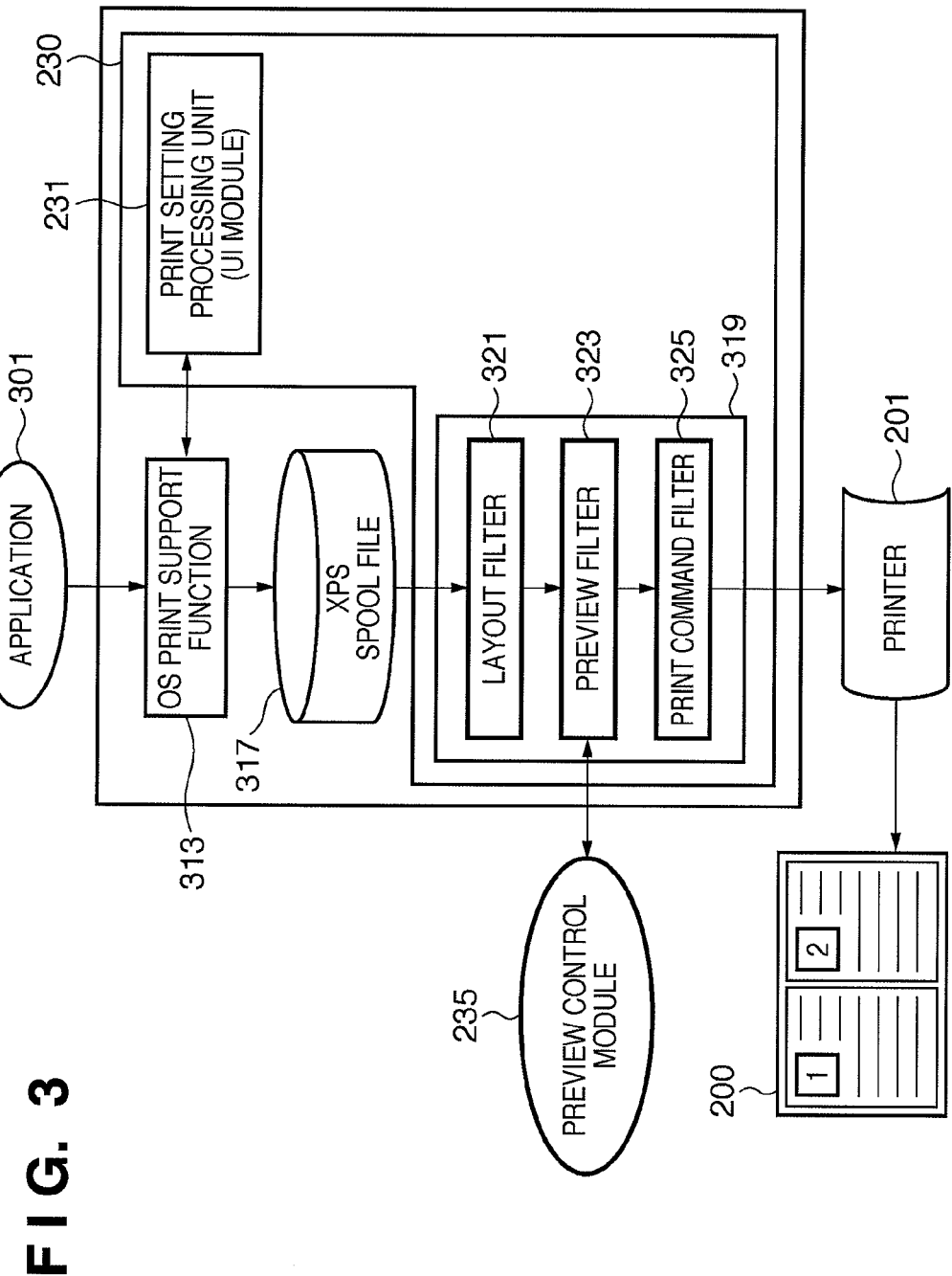
FIG. 3 is a block diagram showing an example of a printer driver according to the embodiment of the present invention.

FIG. 3 is a block diagram conceptually illustrating the print system of FIG. 2 and mainly illustrating an OS print support function and a printer driver for explaining the embodiment of the printer driver in the present invention. Modules related to the present invention are the user interface module 231 and the filter group 319 including a print setting function. The filter group 319 is comprised of a layout filter 321 that has a function of laying out the pages of the XPS data, a preview filter 323 as a filter for providing a preview function, and a print command filter 325 that has a function of converting the XPS data into a print command that the printer can interpret. The filter generally denotes a program having a function of outputting some kind of data through steps, such as processing, conversion, no conversion, and generation, based on input data. The filters indicate different names of the layout processing unit 321, the preview document processing unit 323, and the print command generation processing unit 325 of FIG. 2.

In the print system of FIG. 3, the print data of the pages of a document created by the application 301 is temporarily stored in an XPS spool file 317 through an OS print support function 313. The filter group 319 of the printer driver converts the data into a print command that the printer can interpret based on print setting information. The command is supplied to the printer 201 and printed.

The user interface module 231 generally provides a function of setting the paper size and the print direction used for printing and other attributes. The user interface module 231 returns the print setting information stored with setting values of a plurality of print setting items to the application 301. An example of a print setting dialogue box provided by the user interface module 231 will be described below with reference to FIG. 4.

In the printing of a created arbitrary document, the application 301 notifies the print start or the print end to the OS print support function 313 and notifies the print setting information returned from the user interface module 231 to perform print settings. The application 301 also notifies the drawing start or the drawing end of the pages of the document. The OS print support function 313 stores the content drawn by the application and the print setting information in the XPS spool file 317. The OS print support function invokes the filters to despool a spooled print job.

The filter group 319 of the printer driver is comprised of one or more filters. The filter group 319 has a function of reading out a print job from the XPS spool file during printing, converting the job into a print command that the printer can interpret, and supplying the command to the printer 201 for printing. The filter group 319 in the present embodiment is comprised of the layout filter 321 as a layout processing unit, the preview filter 323 as a preview document creating unit, and the print command filter 325 as a print command conversion unit. However, one filter may realize the layout function and the preview function, and unnecessary filters may be removed. The present proposition is not limited to the above filter configuration.

The layout filter 321 has a function of handling the XPS data stored in the XPS spool file 317 as an input, executing a layout process of the pages based on the print setting information, and outputting the laid out XPS data. The layout process in the present embodiment includes, for example, N-up printing for printing a plurality of pages on one paper surface and poster printing for printing one page on a plurality of paper surfaces.

The preview filter 323 handles an output of the layout filter 321 as an input and provides the preview function to the user based on the print settings.

The print command filter 325 handles an output of the preview filter 323 as an input and has a function of converting the XPS data into a print command that the printer can interpret in accordance with the print setting information and outputting the command. When the print command filter 325 temporarily converts the input XPS data into image data, the filter is generally called a render filter. The render filter is often used in a printer driver for an inexpensive raster printer represented by an inkjet printer. When operated as a render filter, the print command filter 325 temporarily converts the input XPS data into image data. After image processing such as color space conversion and binarization, the data is converted into a print command that the raster printer can interpret. If the XPS is included in the type of print command that the printer can interpret in a highly-functional printer represented by a page printer, the print command filter 325 edits the input XPS data and outputs the XPS data. If the process in the print command filter 325 is not necessary, it is obvious that the input XPS data can be output without conversion or the print command filter 325 does not have to be included in the printer driver.

The printer 201 as an output device has a function of interpreting the print command generated by the print command filter 325 and forming a visible image on printing paper. An example of the print result shown in the print paper 200 illustrates that the layout filter 321 has executed a process of 2-up (arrangement that two pages are reduced and laid out on one surface of the sheet).

<Print Setting Screen>

Figure 4:
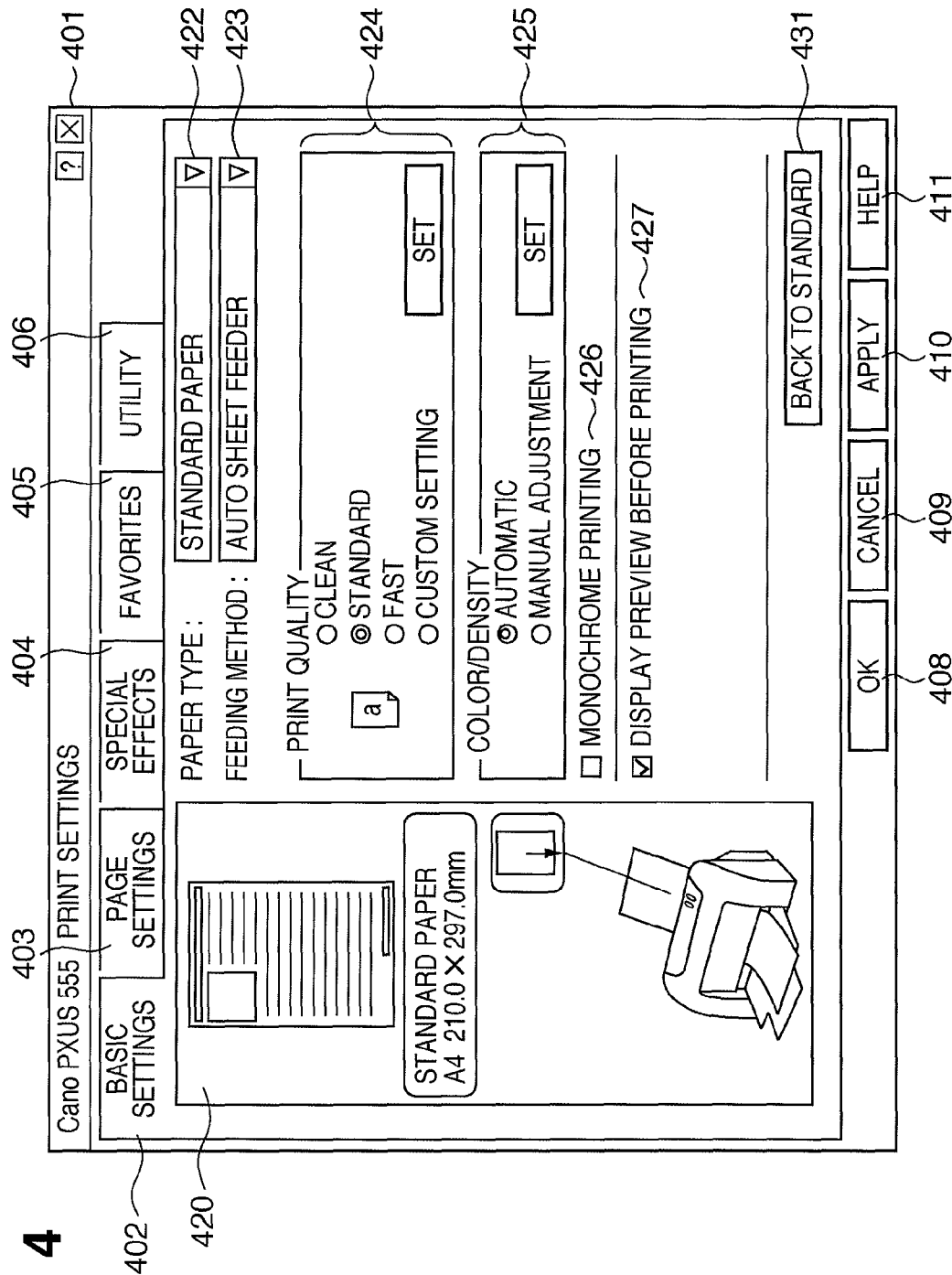
FIG. 4 is a diagram showing an example of a print setting dialogue box according to the embodiment of the present invention.

FIG. 4 is a diagram showing an example of a print setting dialogue box displayed to set a print mode or perform various paper settings in the present embodiment. In FIG. 4, a print setting dialogue box 401 is comprised of display areas 402, 403, 404, 405, 406, 408, 409, 410, 411, 420, 422, 423, 424, 425, 431, and the like. There are a significantly great number of displayed items in the print settings. Therefore, a tab sheet is usually used to classify the setting items by content so that the items can be easily viewed.

FIG. 4 shows a display example when a basic setting tab 402 is selected. A simplified display area 420 of the basic setting displays not only character information, but also information in a visually appealing form. A paper type selecting unit 422 displays the paper type, and the user can select the paper type. The paper type selecting unit 422 is formed by a drop-down menu and usually displays the selected paper type. A list of selectable paper types are displayed by clicking there. The selectable paper types are sheets printable by the printer and include illustrated standard paper, as well as glossy paper, coated paper, photographic paper, postcard, new-year postcard, and the like. A feeding method selecting unit 423 displays a feeding method for the printer main body to feed the paper, and the user can select the feeding method. The user can use the feeding method selecting unit 423 to select, for example, a paper feed tray and a paper cassette as an automatic paper feed port as well as "Manual Feeding" for manually feeding the printer paper sheet by sheet. A print quality selecting unit 424 is an item for the user to set the quality of printing. A color adjusting unit 425 is an item for the user to adjust the color of printing. A monochrome printing setting unit 426 is a checkbox for making the print result black and white even if the printed document is colored. A preview print setting unit 427 is a checkbox for checking how the various print settings are reflected on the printed document before the actual printing by the printer. When a standard setting unit 431 is pressed, the settings of the basic settings 402 are returned to the standard (setting at shipment).

The user can press an OK button 408 after selecting the items to close the print setting dialogue box 401 to reflect the selected print settings on printing. The print setting dialogue box 401 closes when the user presses a cancel button 409, and the content of the selected setting items are abandoned and not reflected on printing. The application button 410 can reflect the selected print settings on printing while the print setting dialogue box 401 remains open. The help button 411 can display explanatory texts related to the setting items of the basic settings 402 on a different window.

<Preview Window of Preview Control Module>

Figure 5:
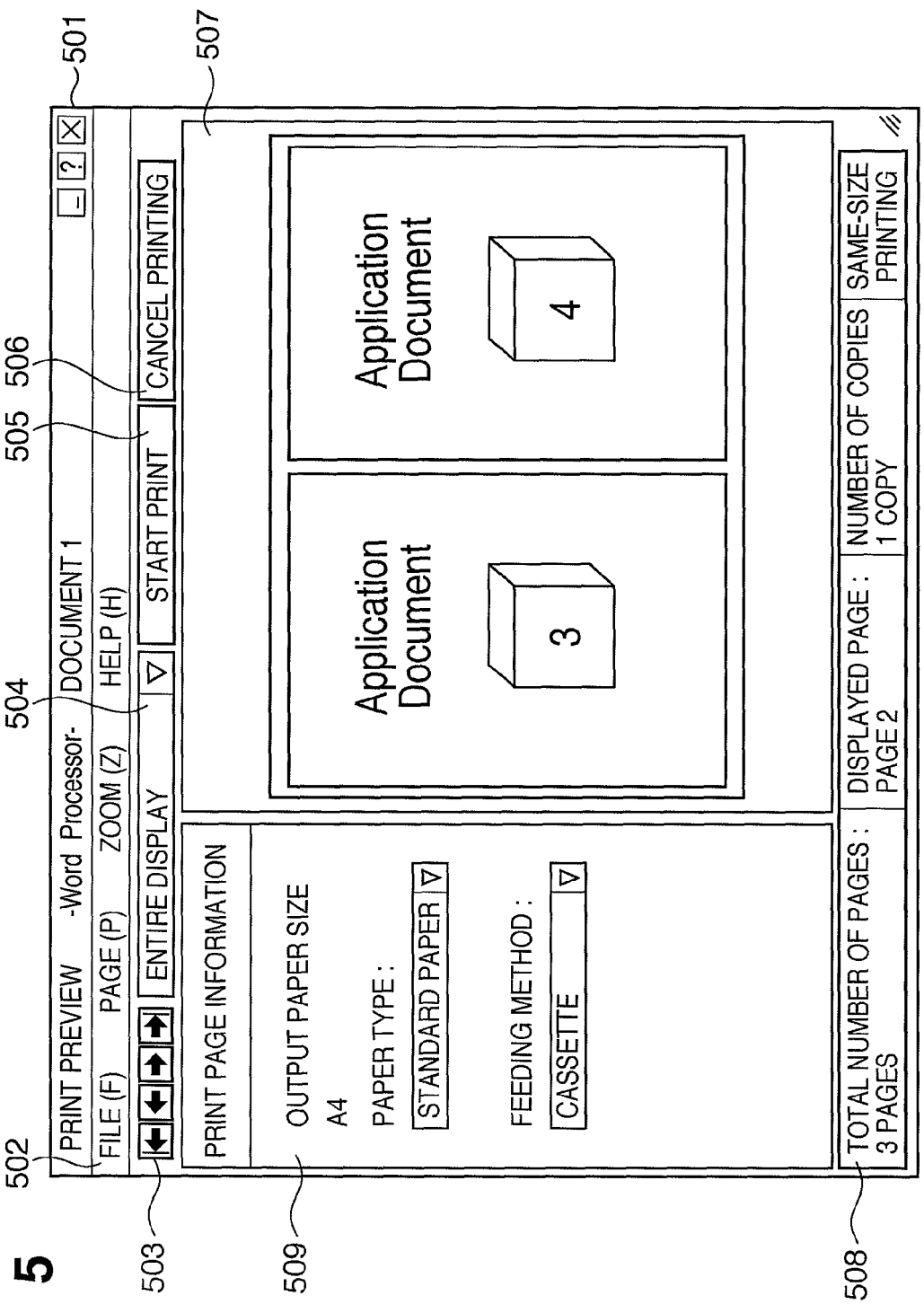
FIG. 5 is a diagram showing an example of a preview window according to the embodiment of the present invention.

FIG. 5 shows an example of a display screen (preview window) provided by a preview control module in the present embodiment. A print preview window 501 serves as a display area for displaying a preview image, print settings of a print job, and the like, and input means for the user to change the display method of the preview image, and the like.

A menu bar 502 allows the user to select an instruction to the previewer, such as display switching, in a menu format. The area where user operation units 503 to 506 are prepared is a tool bar, and the user can easily perform operations, such as switching the preview page, by pressing a tool bar 503 without using the menu bar 502. A page switch button 503 is comprised of four buttons, and the preview display can be switched to the top page, the previous page, the next page, and the last page. A drop-down list 504 is a drop-down list for changing the display size of the preview image, and entire display, 100% display, 200% display, and the like, can be selected. The user can press a print start button 505 to end the previewer, and the previewed XPS document for preview can be printed. The user can press a print cancel button 506 to end the previewer and cancel the print job. A preview display area 507 uses the content of the XPS file for preview to display printing paper and a visible image expected to be formed on the printing paper as a printing image. A display area 508 displays setting values of representative setting items related to the print settings of the print job to which the preview function is applied. FIG. 5 illustrates an example in which the total number of pages of document is three pages, the page number currently previewed and displayed is page 2, the number of copies set in the print settings is one, and the same-size printing is set. A display area 509 displays setting values of representative setting items related to the print settings of the currently displayed page in the print job to which the preview function is applied. FIG. 5 illustrates an example in which the output paper size is A4, the paper type is standard paper, and cassette is set as the feeding method. The user can set and change the paper type and the feeding method in the print preview.

In the present embodiment, the display screen illustrated in FIG. 5 is displayed when a print job associated with print setting information in which the preview setting is ON is spooled, the OS print support function activates a filter pipeline, and the preview filter activates a preview control module.

<Change in Print Settings>

As described, there is a print preview function including functions of checking the print result, checking the print settings, and changing a part of the settings. If a change in the print settings is permitted for individual pages, it may be difficult for the user to recognize the extent of the impact of the changes. Therefore, a method has been implemented in which the print settings can be changed only when all pages have the same print settings, and the changed settings are reflected on the entire job.

The fact that all pages have the same print settings in the XPS means that the PTs of the page level in all pages have the same settings. The PT of the page level is obtained by merging the PT of the default print setting of the user, the PT of the FDS, the PT of the parent FD of the FP to be printed, and the PT of the print target FP. Describing with an example of FIG. 1, the page level PT of the FP 121 is a PT in which the PT of the default print setting of the user, the PT 131 of the FDS 103, the PT 133 of the parent FD 111, and the PT 135 of the FP 121 are merged. Since there is no PT in the FP in the FP 123, the page level PT of the FP 123 is a PT in which the PT of the default print setting of the user, the PT 131 of the FDS 103, and the PT 133 of the parent FD 111 are merged. Similarly, since there is no PT in the FP in the FP 125, the page level PT is a PT in which the PT of the default print setting of the user, the PT 131 of the FDS 103, and the PT 137 of the parent FD 113 are merged. Therefore, in order for all pages to have the same print settings, the PT, in which the PT 133 of the FD 111 and the PT 135 of the FP 121 are merged, the PT 133 of the FD 111, and the PT 137 of the FD 113 need to have the same print settings. To simply determine the sameness, the common print settings, or the PT of the default print setting of the user and the PT 131 of the FDS 103 in this case, can be removed from the merging target.

<Print Setting Determination Process Between Pages>

There is a method of comparing all PTs of the page level to determine whether all pages in a job have the same print settings. In that case, the print settings described in the PTs need to be compared one by one, and a large process load may be imposed depending on the number of pages or the content of the settings. Furthermore, the sameness may not be determined when the PTs are compared in the binary level because there is a difference in the description or the aligned order even in the same settings. Thus, a method of determination based on the arrangement of the PTs will be proposed to determine the same print settings while minimizing the comparison of the content of the PTs.

Figure 6A:
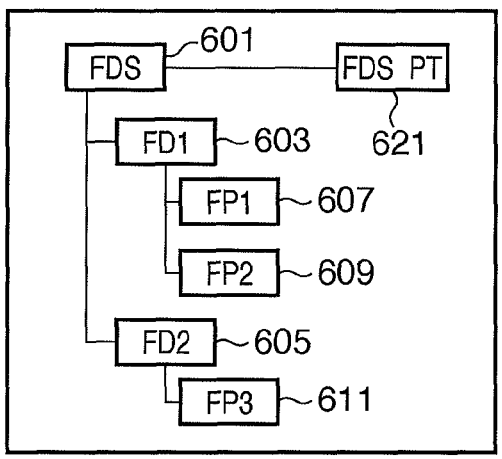
FIGS. 6A and 6B are diagrams showing an example of the XPS illustrating basic conditions used in the sameness determination of print settings according to the embodiment of the present invention.
Figure 6B:
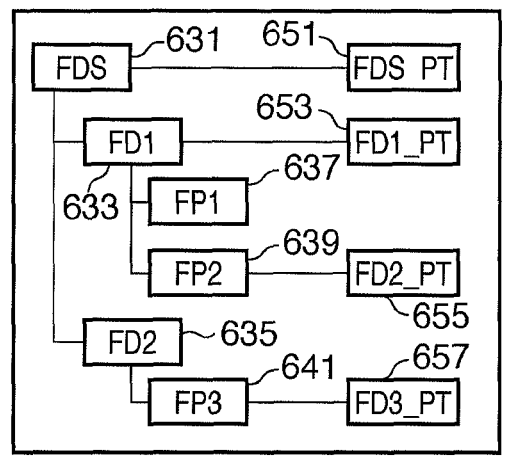

If there is no PT in any FD and FP, the print settings of all pages are determined to be the same. An example of FIG. 6A will be described in which there is a PT 621 only in an FDS 601, and there is no PT in FDs 603 to 605 and FPs 607 to 611. In this case, the PTs of the page level of all FPs are PTs obtained by merging the PT of the default print setting of the user and the PT 621 of the FDS 601 and are the same print settings. On the other hand, there is a case in which a PT exists in the FD and the FP as shown in FIG. 6B. There are a PT 651 in an FDS 631, a PT 653 in an FD 633, and PTs 655 and 657 in FPs 639 and 641. In this case, the PTs of the page level are obtained by merging the PTs 651 and 653 with the PT of the default print setting in the FP 637, merging the PTs 651, 653, and 655 with the PT of the default printing setting in the FP 639, and merging the PTs 651 and 657 with the PT of the default printing setting in the FP 641. Therefore, the FPs have different PTs of the page level, and it is unlikely that the print settings are the same. In this way, the presence of PT in the FD and the FP is a basic condition for determining whether all pages have the same print settings.

The accuracy of determination is further improved by adding the following conditions to the above condition.

If there is a PT without description of the print settings in the FD and the FP (hereinafter, "blank PT"), it is assumed that the PT is not added.

If there is only one FP, it is assumed that all pages have the same print settings even if there is a PT in the FD and the FP.

If there is only one FD, it is assumed that all pages have the same print settings if there is no PT in the FP even if there is a PT in the FD.

If there is one FD or if there is no PT in any FD, it is assumed that all pages have the same print settings if the same PT is associated with all FPs.

Figure 7A:
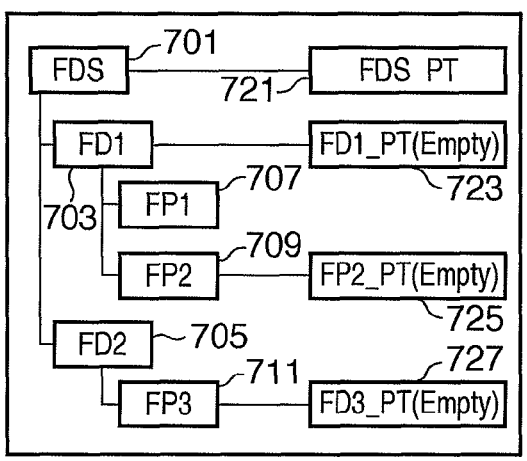
FIGS. 7A, 7B, 7C, and 7D are diagrams showing an example of the XPS illustrating additional conditions used in the sameness determination of the print settings according to the embodiment of the present invention.

As shown in FIG. 7A, if the PT is blank even if there is a PT in the FD or the FP, the settings are not influenced when the PT of the default print setting of the user and the PT of the FDS are merged. Therefore, it is equivalent to the case without the PT. More specifically, in FIG. 7A, the PTs of the page level of the FPs 707 to 711 are all obtained by merging the PT of the default print setting of the user and a PT 721 of an FDS 701, and it can be stated that all pages have the same print settings. Although the content of the PT needs to be referenced to determine whether the PT is blank, the determination is possible with extremely small load since no setting is described in the PT.

Figure 7B:
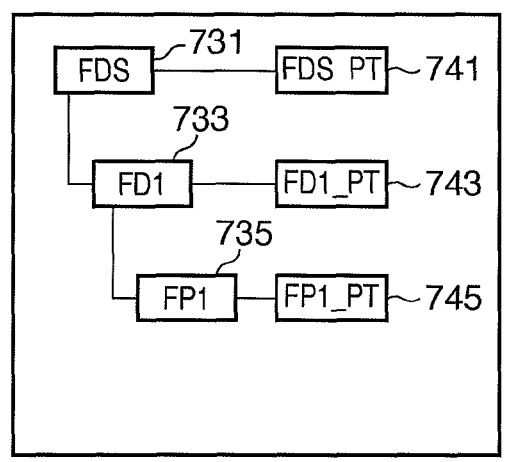

If there is only one FP as in FIG. 7B, it is obvious that there is no case that the print settings are different page by page. Therefore, it can be stated that all pages have the same print settings even if there is a PT in the FD and the FP.

Figure 7C:
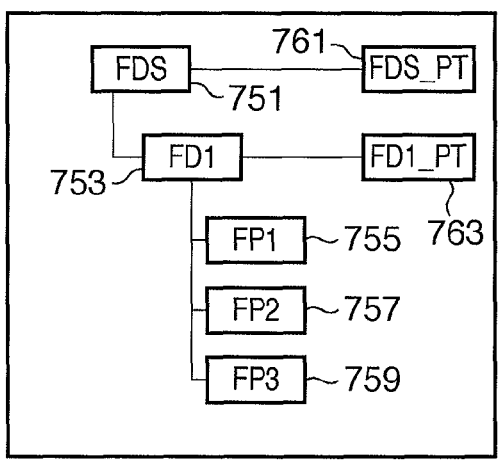

If there is only one FD as in FIG. 7C, all FPs have the same parent FD, and the same PT of the FD is used for merging in creating the PT of the page level. Therefore, if there is one FD, all pages have the same print settings regardless of the presence of the PT of the FD if there is no PT in the FP. In FIG. 7C, all PTs of the page level of FPs 755 to 759 are obtained by merging the PT of the default print setting of the user, a PT 761 of an FDS 751, and a PT 763 of an FD 753. It can be stated that all pages have the same print settings.

Figure 7D:
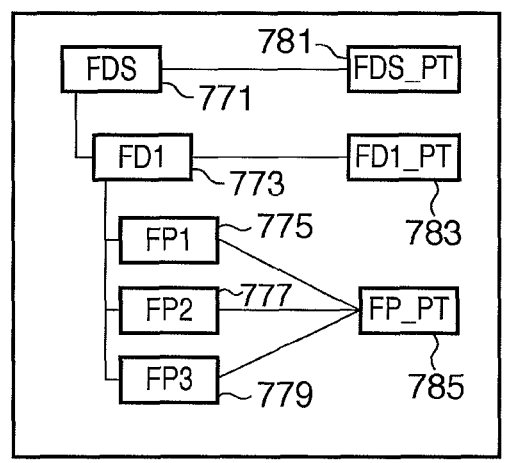

If all FPs are associated with the same PT as in FIG. 7D, all PTs of the page level are the same if the PTs of the parent FD of all FPs are the same. Therefore, if there is only one FD or if there is no PT in any FD, all pages have the same print settings. In FIG. 7D, the PTs of the page level of FPs 775 to 779 are all obtained by merging the PT of the default print setting of the user, a PT 781 of an FDS 771, a PT 783 of an FD 773, and an PT 785 commonly associated with all FPs. Therefore, it can be stated that all pages have the same print settings.

In summary, it is determined that all pages have the same print settings if the print settings of the elements of the layers are common in the elements. Specifically, it can be determined that the pages of a structural document have the same print settings if the print setting information is added to the elements of a layer in the XPS data to be processed (or structural document) or if all elements of the layer share the print setting information added to the elements of the layer and all layers meet the condition. In this way, the sameness can be formally determined regardless of the actual print settings, and simple and quick determination is possible.

<Preview Filter Process>

Figure 8:
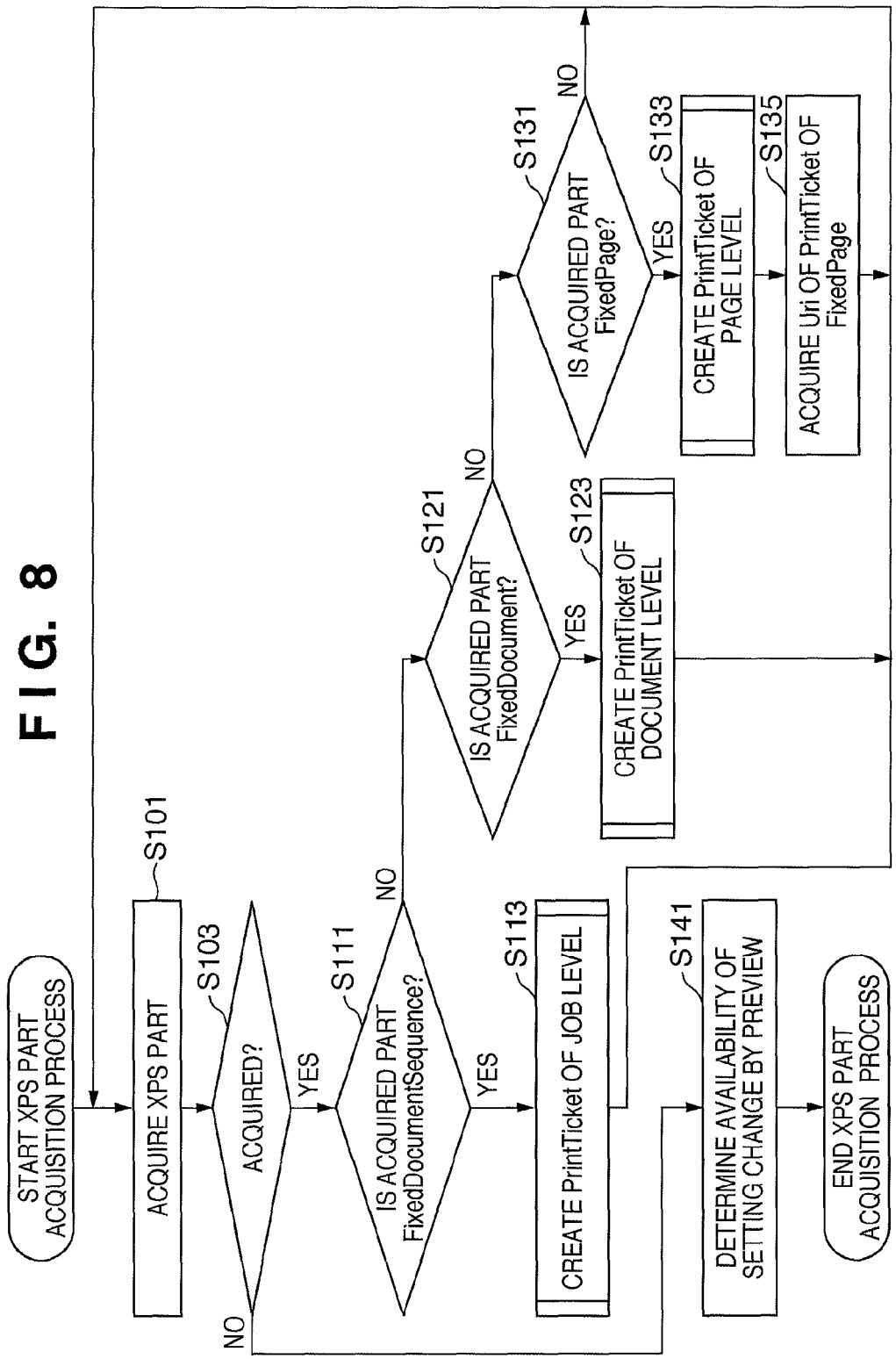
FIG. 8 is a diagram showing an example of an acquisition process of an XPS part according to the embodiment of the present invention.

FIG. 8 is an example of a flow chart of the determination process described with FIGS. 7A to 7D in an acquisition process of XPS parts executed by the preview filter 323. The present process may be executed not only by a preview filter, but also by, for example, the preview control module 235 before the preview process.

In step S101, the preview filter 323 sequentially acquires XPS parts transferred from the spool or the previous filter. The acquired XPS parts are FDSs, FDs, and FPs. If it is determined in step S103 that the XPS parts are acquired, processes are executed according to the type of the acquired parts in accordance with the determination result. The types of XPS parts are described with identifiers, or the like, in the elements. On the other hand, if the XPS parts are not acquired, it is determined that all XPS parts of the XPS data are acquired, and the process diverges to step S141.

In steps S111, S121, and S131, the acquired parts are discriminated. If the acquired part is an FDS, a PT of the job level corresponding to the FDS is created in step S113. A PT generation process of the job level will be described below with reference to FIG. 9. If the acquired part is an FD, a PT of the document level corresponding to the acquired FD is created in step S123. A PT generation process of the document level will be described below with reference to FIG. 10. If the acquired part is an FP, a PT of the page level corresponding to the acquired FP is created in step S133. A PT generation process of the page level will be described below with reference to FIG. 11. A URI (or a link, or can also be called association) of the PT is acquired for the PT of the FP (step S135).

The processes are repeated until all XPS parts are acquired. The process moves to step S141 when all XPS parts are acquired, and whether a print setting change in preview will be permitted is determined. A determination process of print setting change availability in preview will be described below with reference to FIG. 12. Although a method of determination after the acquisition of the XPS parts will be described herein, the determination process can also be executed during the acquisition of the XPS parts.

<Merge Process of PT>

Figure 9:
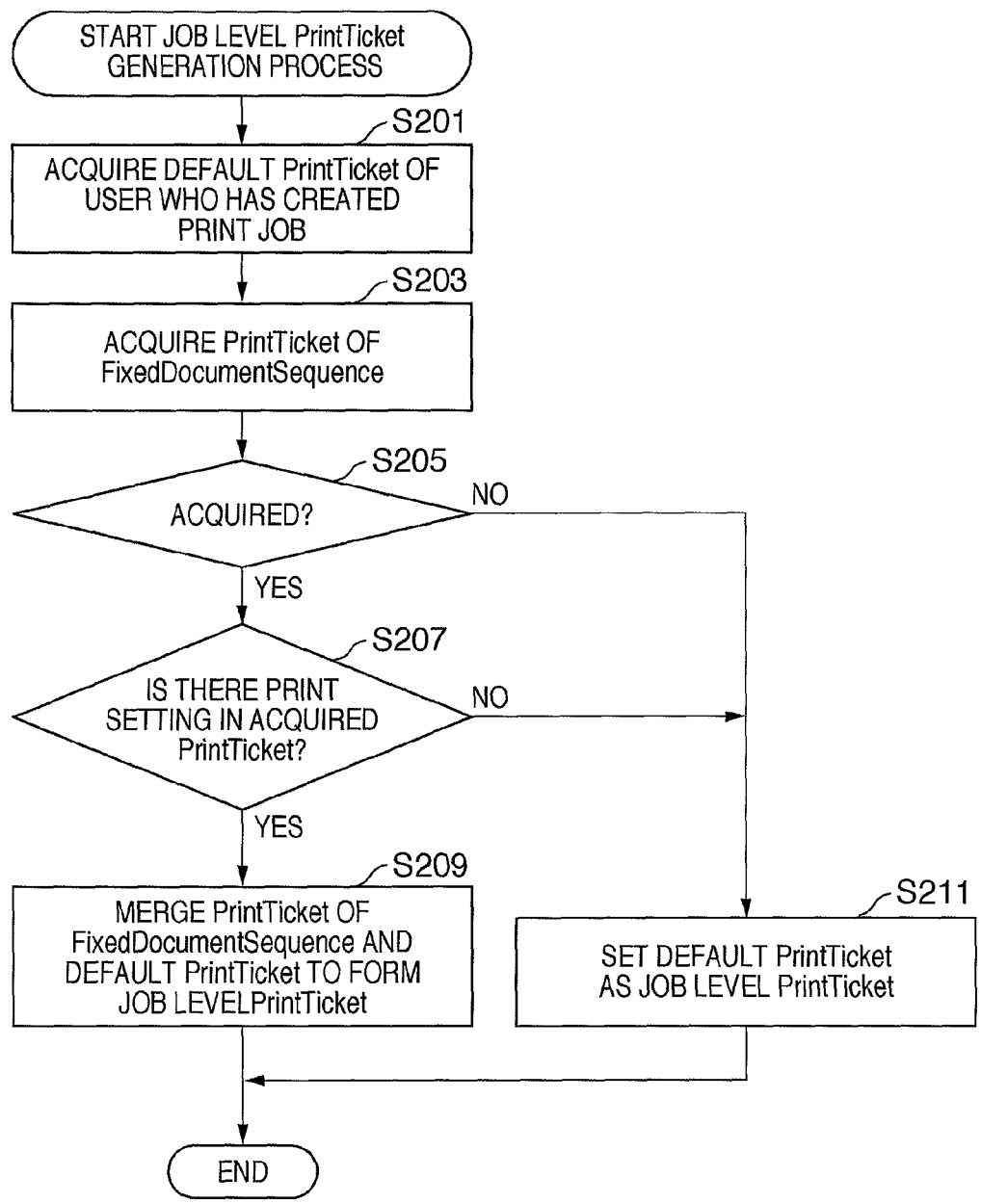
FIG. 9 is a diagram showing an example of a PT generation process of a job level according to the embodiment of the present invention.

FIG. 9 illustrates details of step S113 of FIG. 8 and is an example of a PT generation process of the job level. In step S201, the PT of the default print setting of the user is first acquired. In step S203, the PT of the acquired FDS is acquired. Since the PT does not always exist in the FDS, whether the PT of the FDS is acquired is determined (S205). The process moves to S207 if the PT of the FDS is acquired and moves to S211 if not acquired. In step S207, whether the acquired PT is a blank PT is determined. The process moves to step S209 if the print settings are described and moves to step S211 if the PT is blank. In step S209, the PT of the default print setting of the user and the PT of the FDS are merged to generate a PT of the job level. In step S211, since there is no PT in the FDS or the PT is blank so that the PT is assumed not to exist, the PT of the default print setting of the user is set as the PT of the job level without merging.

Figure 10:
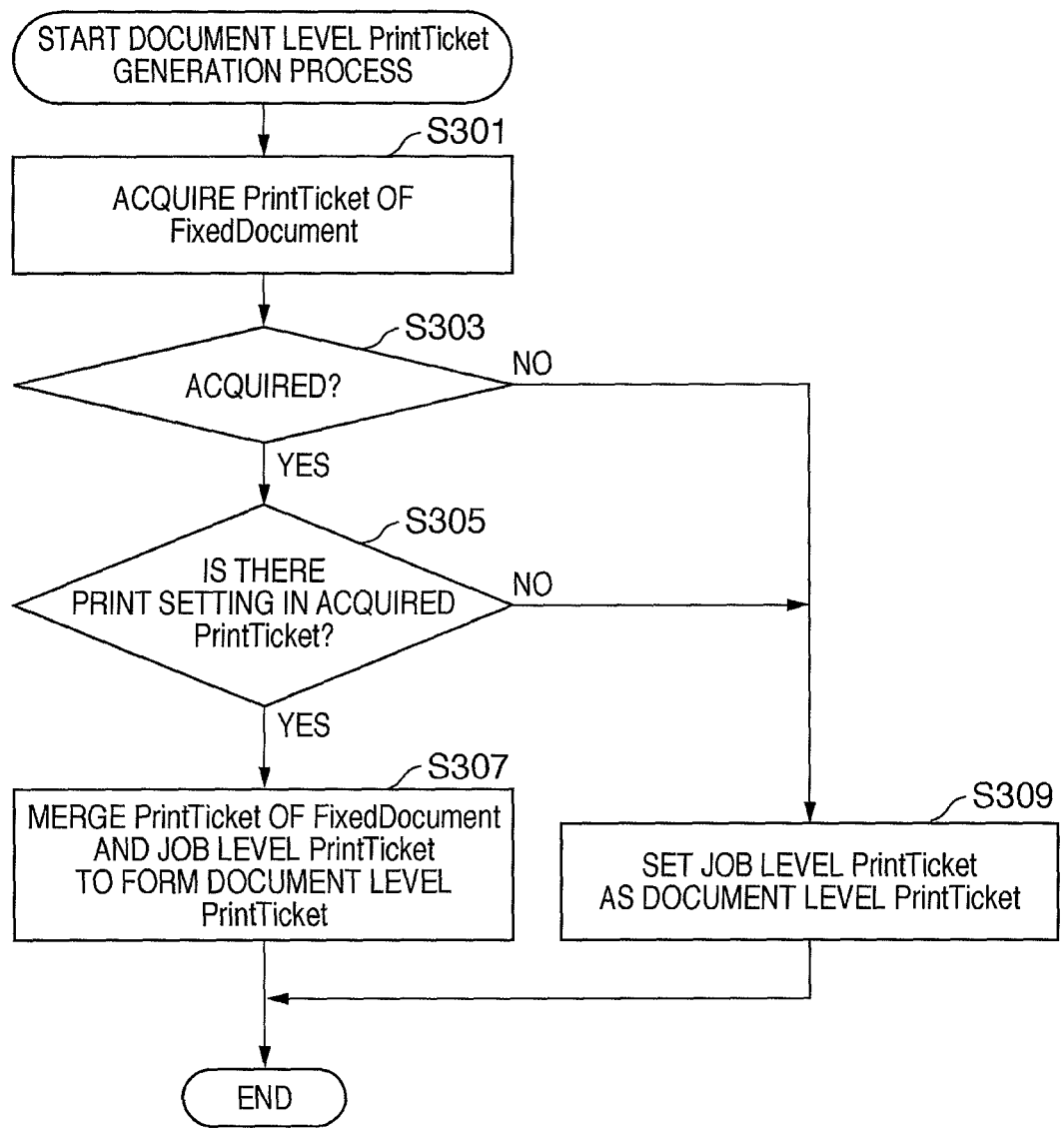
FIG. 10 is a diagram showing an example of a PT generation process of a document level according to the embodiment of the present invention.

FIG. 10 illustrates details of step S123 of FIG. 8 and is an example of a PT generation process of the document level. The PT of the acquired FD is first acquired in step S301, and whether the PT is acquired is determined (S303). The process moves to step S305 if the PT is acquired and moves to step S309 if not acquired. In step S305, whether the acquired PT is a blank PT is determined. The process moves to step S307 if the print settings are described and moves to step S309 if the PT is blank. In step S307, the PT of the job level and the acquired PT of the FD are merged to generate a PT of the document level. In step S309, since there is no PT of the FD, the PT of the job level is set as the PT of the document level. Since the FDS is always acquired before the FD in the XPS part acquisition, there is always a PT of the job level when the PT of the document level is generated.

Figure 11:
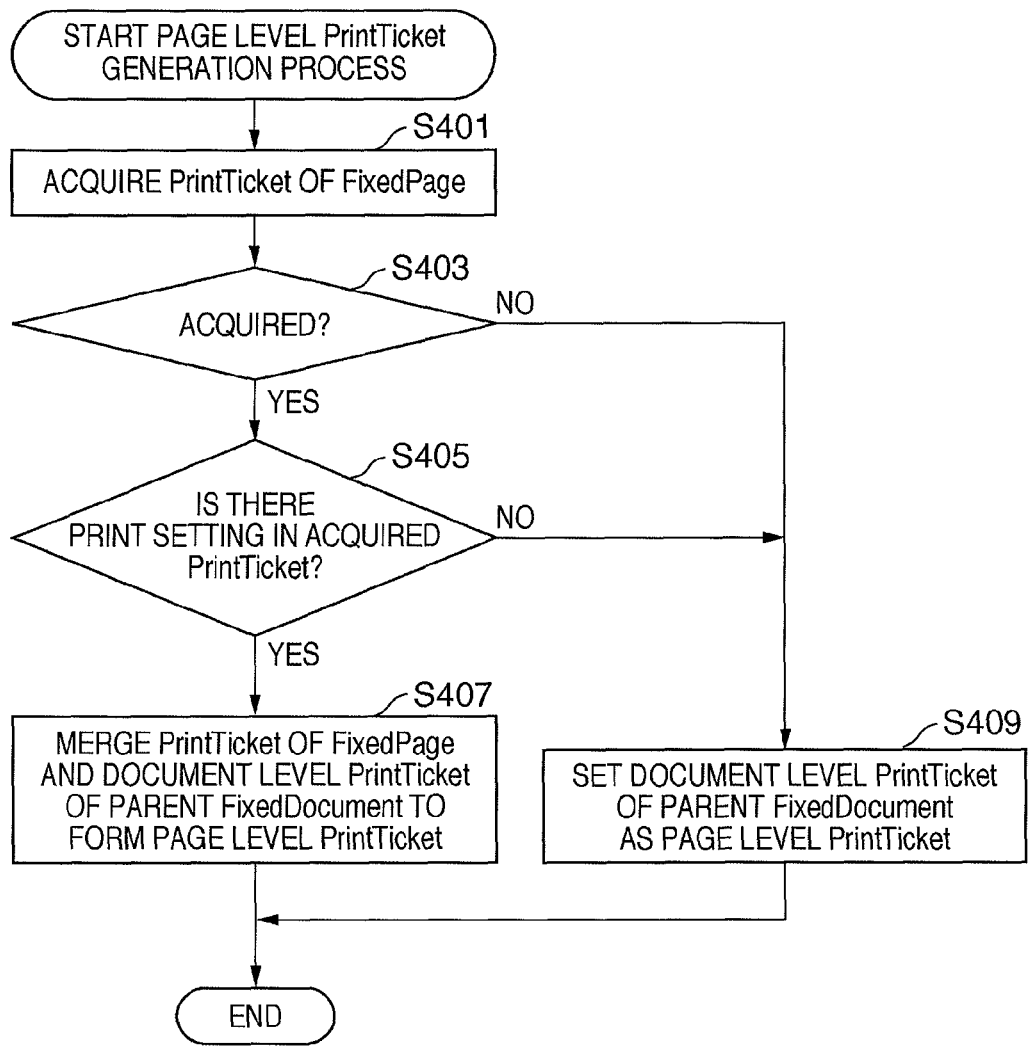
FIG. 11 is a diagram showing an example of a PT generation process of a page level according to the embodiment of the present invention.

FIG. 11 illustrates details of step S133 of FIG. 8 and is an example of a PT generation process of the page level. The PT of the acquired FP is first acquired in step S401, and whether the PT of the FP is acquired is determined (S403). The process moves to step S405 if the PT of the FP is acquired and moves to S409 if not acquired. In step S405, whether the acquired PT is a blank PT is determined. The process moves to step S407 if the print settings are described and moves to step S409 if the PT is blank. In step S407, the PT of the document level of the parent FD of the FP and the PT of the acquired FP are merged to generate a PT of the page level. In step S409, since there is no PT of the FP, the PT of the document level of the parent FD is set as the PT of the page level. Since the parent FD of the FP is always acquired before the acquisition of the FP, there is always a PT of the document level of the parent FD when the PT of the page level is generated.

<Determination Process of Availability of Change in Print Setting Information in Preview>

Figure 12:
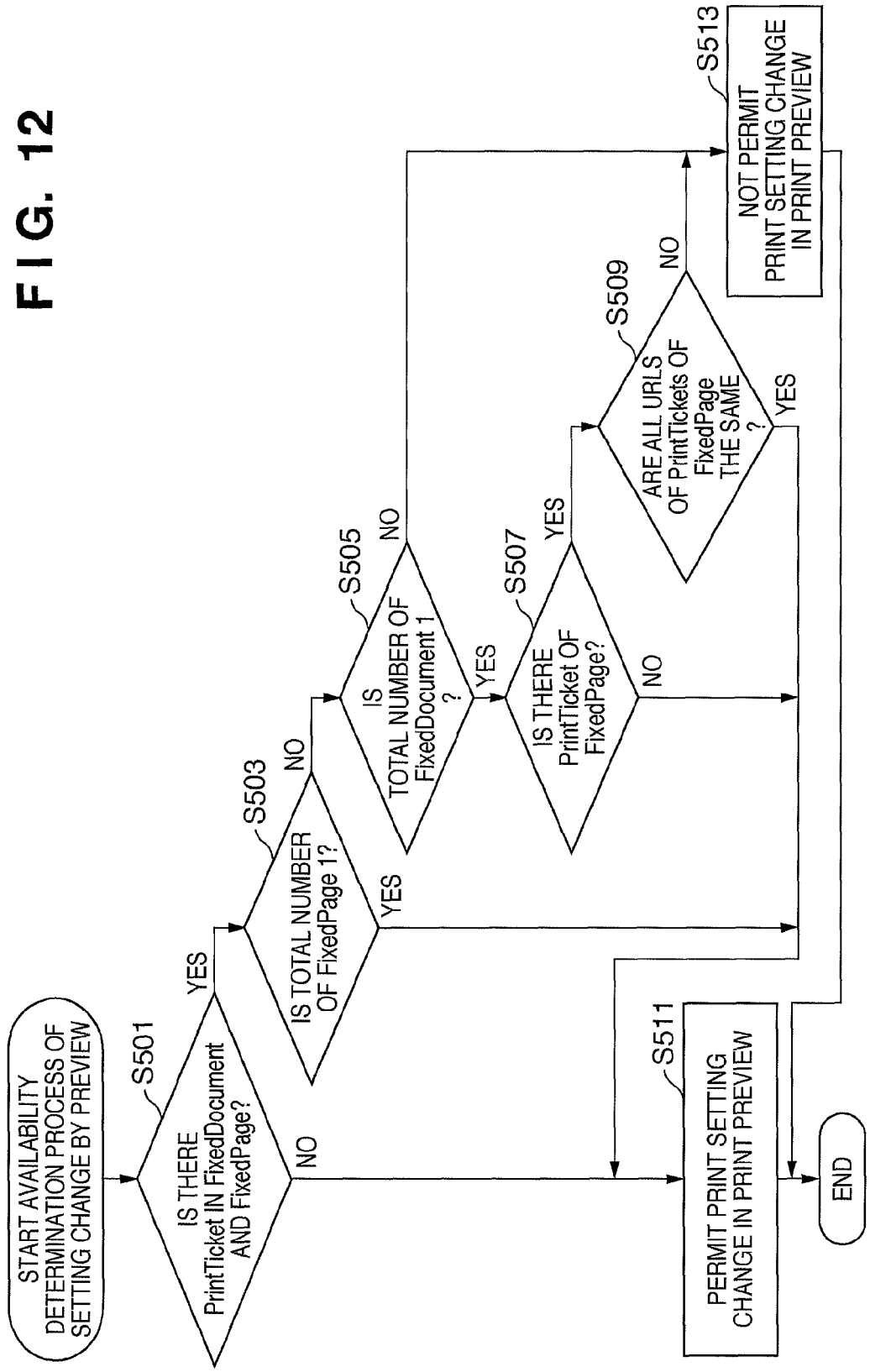
FIG. 12 is a diagram showing an example of a print setting change availability determination process according to the embodiment of the present invention.

FIG. 12 is an example of a flow chart of a process of determining whether all pages have the same print settings and determining whether to permit a print setting change by the preview. Whether there is at least one PT in the acquired FD or FP is determined first in step S501. However, even if there is a PT, it is determined that there is no PT if the PT is a blank PT. The process moves to step S511 if there is no PT, and the user is permitted to change the print settings in the print preview. The permission can be realized by, for example, setting a prohibit flag of setting change to a value indicating the change permission. The process moves to step S503 if there is a PT. In step S503, the total number of FPs in the job is determined. The process moves to step S511 if there is only one acquired FP, and the user is permitted to change the print settings in the print preview. The process moves to step S505 if there are a plurality of FPs. In step S505, the total number of FDs in the job is determined. The process moves to step S507 if there is only one acquired FD. The process moves to step S513 if there are also a plurality of FDs, and the change in the print settings in the print preview is not permitted. Whether there is a PT in the FP is determined in step S507. The process moves to step S511 if there is no PT in any FP, and the user is permitted to change the print settings in the print preview. The process moves to step S509 if there is a PT in the FP. In step S509, whether all FPs are associated with the same PT is determined. The process moves to S511 if the URIs of the PTs acquired when the PTs of the FP are acquired are the same in all FPs, i.e., if the URIs are associated with the same print setting information, and the user is permitted to change the print settings in the print preview. The process moves to step S513 if the associated PTs are different page by page, and the change in the print settings in the print preview is refused. The refusal can be realized by, for example, setting the prohibit flag of the setting change to a value indicating the change prevention.

If a change in the print settings is instructed from the user interface during the preview display, the prohibit flag of the setting change is referenced, for example. If the flag indicates the change permission, the change in the setting value is accepted. If the flag indicates the prohibition, the setting value is just displayed, and the change is not accepted. In the present embodiment, this is applied only to the setting change during the preview display. The prohibit flag of the setting change is not referenced during the setting change without preview display, and the setting change is accepted. However, other than the preview display, the prohibit flag of the setting change provided by a value in the procedure of FIG. 12 may be referenced when a change operation of the print settings is performed in a case that the change in the print settings is permitted only when all pages have the same print settings.

As a result of the determination process, whether the page-by-page print settings are the same in all pages can be highly accurately determined while minimizing the reference to the content of the PTs.

<Reflection of Setting Changes (Print Setting Information Edit>

When the change in the print settings in the print preview is permitted in the determination process and the user changes the print settings in the print preview, the changed settings need to be reflected on the PTs. Basically, on which PTs the changed print settings will be reflected depends on the setting item. For example, the PT of the FDS is updated in the case of a setting item that needs to be reflected on the entire job, and the PT of the FP needs to be updated in the case of a setting item reflected only on a specific page. However, in the present embodiment, the change in the print settings is permitted only when all pages have the same print settings, and the change is reflected on all pages. More specifically, the same print settings are described in all PTs of the page level, and the settings after the print setting change needs to be reflected on all pages. Therefore, a method is proposed in which the PTs of the page level are updated according to the print setting changes, the updated PTs are added to the FDS, and the PTs in the FD and the FP are deleted.

Figure 13:
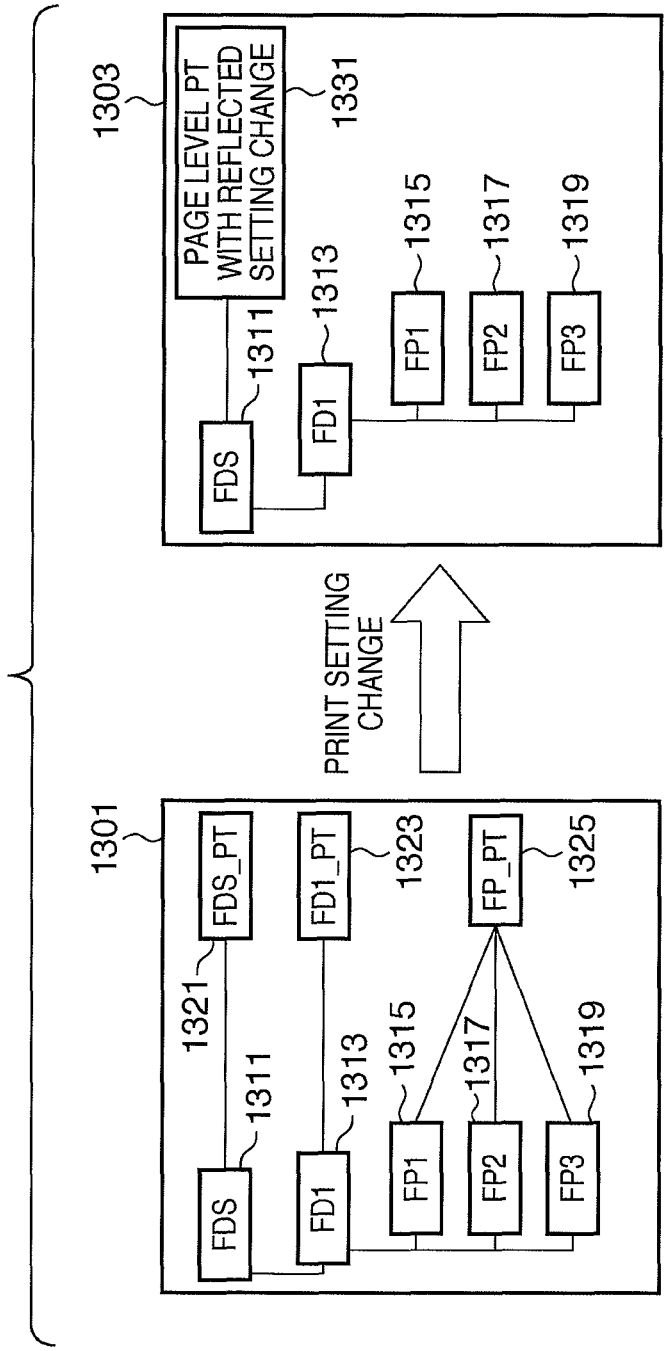
FIG. 13 is a schematic diagram showing reflection of a print setting change on XPS data according to the embodiment of the present invention.

FIG. 13 is an example of XPS data created when a change in the print settings is reflected by the method of the present embodiment. XPS data 1301 before change is comprised of an FDS 1311, an FD 1313, and FPs 1315 to 1319. There are a PT 1321 in the FDS 1311, a PT 1323 in the FD 1313, and a PT 1325 in the FPs 1315 to 1319. In this case, all PTs of the page level of the FP are PTs in which the PT of the default print setting of the user, the PT 1321 of the FDS 1311, the PT 1323 of the FD 1313, and the PT 1325 of the FP are merged. As a result, it is determined that all pages have the same print settings, and the print setting change in the print preview is permitted. When the print settings are changed, the updates are reflected on the PTs of the page level. The PT 1331 of the page level with reflected changes replaces the PT 1321 of the FDS 1311. The PT 1323 of the FD 1313 and the PT 1325 of the FPs 1315 to 1319 are further deleted to form XPS data 1303 in which the changed print settings are reflected. Since there is no PT in the FD and the FP in the XPS data 1303, all PTs of the page level of the FP are obtained by merging the PT of the default print setting of the user and the PT 1331 newly added to the FDS 1311. As a result, a change in the print settings by the user can be reflected on all pages with minimum change in the PTs.

<Print Ticket Update Process>

Figure 14:
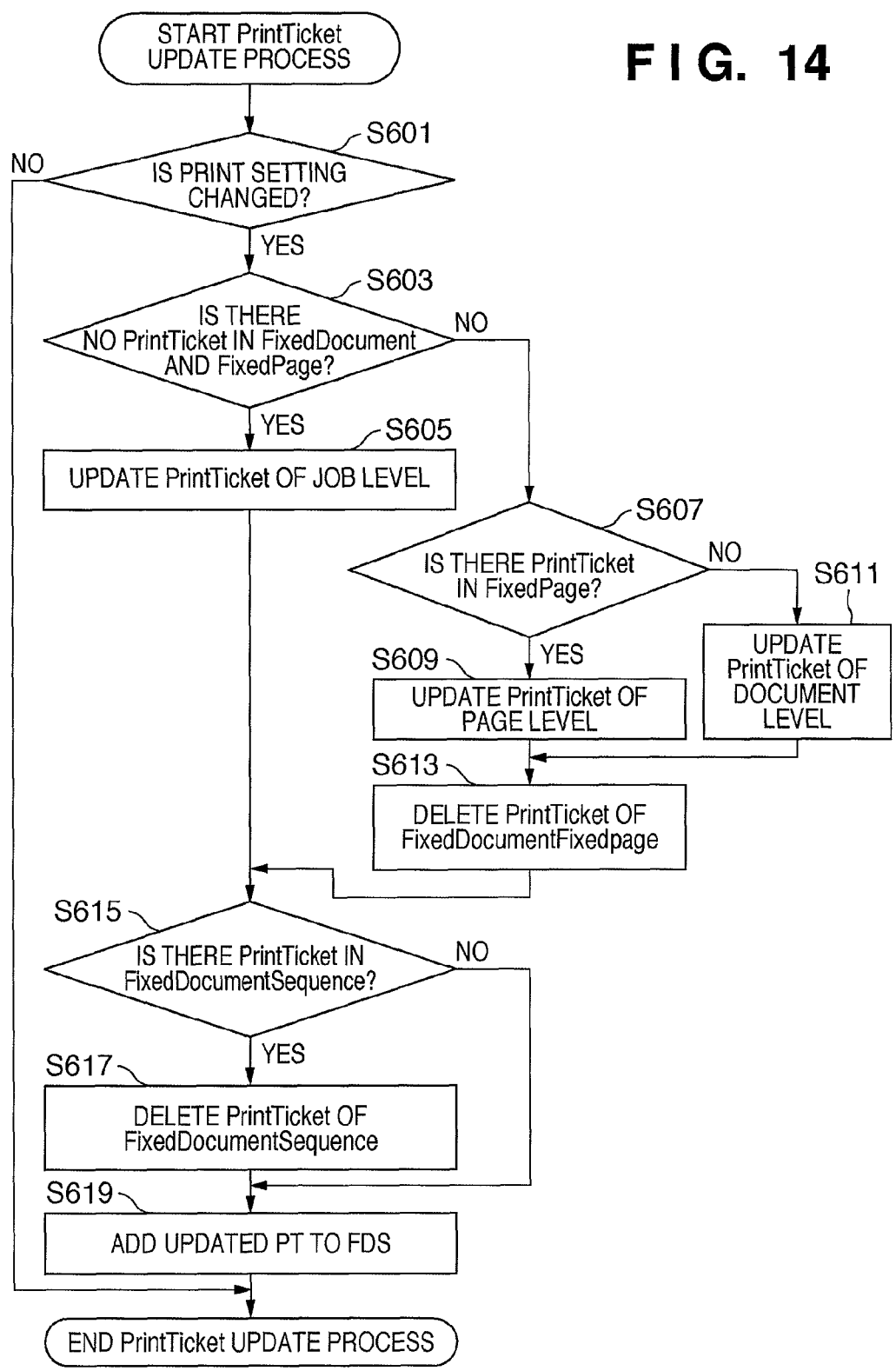
FIG. 14 is a diagram showing an example of a PT update process according to the embodiment of the present invention.

FIG. 14 is an example of a flow chart of a PT update process for reflecting the print setting changes on the PTs when the change in the print settings is permitted and the print settings are actually changed. This procedure is executed by, for example, the preview filter 323 and the preview control module 325. First, in step S601, whether print settings are changed is determined. The determination can be realized by, for example, referencing a flag, or the like, storing that the setting change operation is performed. The flag needs to be reset after the process of FIG. 14. The process moves to step S603 if the print settings are changed, and if there is no change, the update process ends. In step S603, whether there is a PT in the FD or the FP is determined. The process moves to step S605 if there is no PT, and the process moves to step S607 if there is a PT. The PTs of the job level are updated in step S605 based on the changes, and the process moves to step S615. Since there is no PT in the FD and the FP, the PTs of the job level are synonymous with the PTs of the page level. In step S607, whether there is a PT in the FP is determined. The process moves to step S609 if there is a PT, and the process moves to step S611 if there is no PT. The PTs of the page level are updated in step S609 based on the changes, and the process moves to step S613. The PTs of the document level are updated in step S611 based on the changes, and the process moves to step S613. Since there is no PT in the FP, the PTs of the job level are synonymous with the PTs of the page level. All PTs in the FD and the FP are deleted in step S613, and the process moves to S615. In step S615, whether there is a PT in the FDS is determined. The process moves to step S617 if there is a PT, and the process moves to step S619 if there is no PT. The PTs in the FDS are deleted in step S617, and the process moves to step S619. The updated PTs are added to the FDS in step S619 based on the setting changes, and the process ends. As a result, the changed print settings are reflected on all pages in the job.

Although the determination process of print settings and the reflection process of setting changes are executed in the preview filter in the present embodiment, the processes can be executed in any stage of the driver process. The processes can be applied not only to the printer driver process, but also to, for example, an application that edits XPS documents.

Second Embodiment

In the first embodiment, whether all pages have the same print settings is determined based on the arrangement of the PTs, and the content of the PTs is not referenced except in the determination of a blank PT. However, even if there are different PTs in the FPs, it can be stated that the print settings of the pages are the same if the settings described in all PTs are the same. In such a case, the print settings that are actually the same are determined to have different settings in the first embodiment. Therefore, in addition to the method of the first embodiment, a method is proposed in the present embodiment in which DevmodeSnapShot is used to compare the settings without comparing the individual print settings described in the PTs. The DevmodeSnapShot is formed by converting DEVMODE as a data structure including print setting information, or the like, into binary data and is described in the PT. Since the DevmodeSnapShots include the same data if the print settings are the same, whether the print settings are the same can be determined by comparing the binary data of the DevmodeSnapShots.

<Comparison Process of DevmodeSnapShot>

Figure 15:
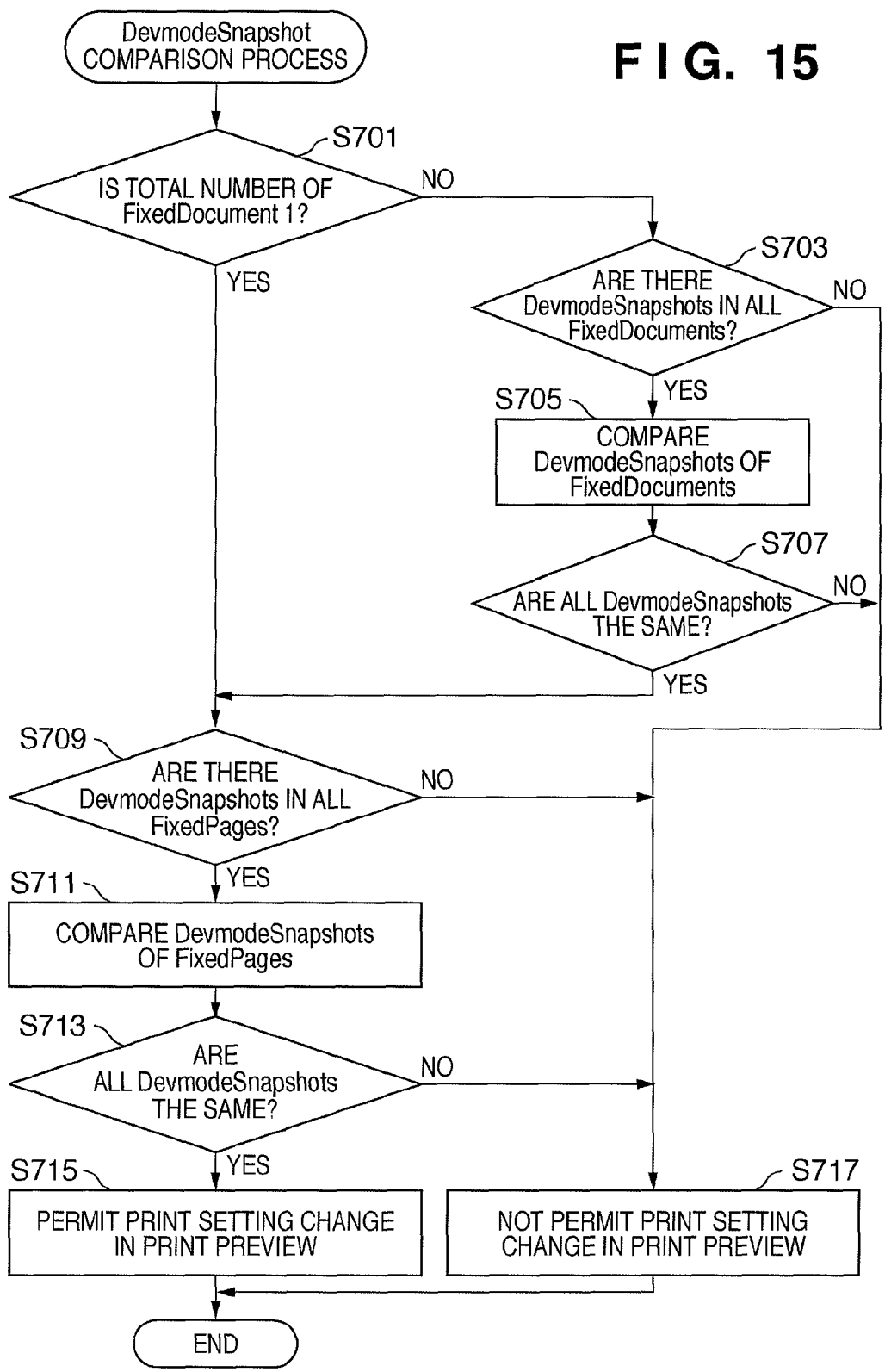
FIG. 15 is a diagram showing an example of a comparison process of print settings using DevmodeSnapShot according to the embodiment of the present invention.

FIG. 15 is an example of a flow chart of a DevmodeSnapShot comparison process. Whether there are a plurality of FDs is determined in step S701. If there is one FD, the process moves to step S709 as there is no need to compare the DevmodeSnapShot of the FD. The process moves to step S703 if there are a plurality of FDs. The DevmodeSnapShots included in the PTs of the FDs are compared in steps S703 to S707. Since the DevmodeSnapShot is not always included in all PTs, whether there is DevmodeSnapShot in all PTs of the FDs is determined in step S703. If there is DevmodeSnapShot in all PTs of the FDs, the process moves to step S705. If not all PTs of the FDs include the DevmodeSnapShot, the process moves to step S717. In step S717, the print setting change by the user in the print preview is not permitted, and the process ends. In step S705, the DevmodeSnapShots included in the PTs of the FDs are compared, and the process moves to step S707. As a result of the comparison, the process moves to step S709 if all DevmodeSnapShots are the same, and the process moves to step S717 if there is a different DevmodeSnapShot. In step S717, the print setting change by the user in the print preview is not permitted, and the process ends. Similarly, the DevmodeSnapShots included in the PTs of the FPs are compared in steps S709 to S713. In step S709, whether there are DevmodeSnapShots in all PTs of the FDs is determined. The process moves to step S711 if there are DevmodeSnapShots in all PTs of the FDs, and the process moves to step S717 if not all PTs of the FPs include the DevmodeSnapShot. In step S717, the print setting change by the user in the print preview is not permitted, and the process ends. In step S711, the DevmodeSnapShots included in the PTs of the FPs are compared, and the process moves to step S715. As a result of the comparison, the process moves to step S715 if all DevmodeSnapShots are the same. In step S715, the print setting change by the user in the print preview is permitted, and the process ends. If there is a different DevmodeSnapShot, the process moves to step S717. In step S717, the print setting change by the user in the print preview is not permitted, and the process ends.

There are PTs in all FDs and FPs in the description of the method. However, in a part without PT, the PT of the parent part of the part is handled as the PT of the part. For example, if there is no PT in the FD, the PT of the FDS is alternatively handled as the PT of the FD. The PT of the parent FD is also used if there is no PT in the FP, and the parent FDS is further handled as the PT of the FP if there is no PT in the parent FD either.

According to the method, in relation to the data in which DevmodeSnapShots are described in the PTs, whether the print settings are the same can be determined by comparing the binary data without comparing the individual settings described in the PTs. The determination accuracy can be improved by implementing the present method in conjunction with the method of the first embodiment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-318941, filed Dec. 15, 2008 which is hereby incorporated by reference herein in its entirety.

What is claimed is:

1. A document processing apparatus that handles a structured document comprising a layer of page element and a layer of document element including the page element, wherein print setting information are allowed to be attached to each element of the respective layers, the document processing apparatus comprising:
at least one processor and at least one memory coupled to each other and cooperating to act as:
a determination unit which determines whether or not the print setting information is attached to each element of the layer of page element, and determines a total number of the page element and/or a total number of the document element; and
a control unit which controls a change of print setting information for whole structured document to automatically permit a user to change the print setting information for the whole structured document or automatically prohibit the user from changing the print setting information for the whole structured document based on the determination result of the determination unit,
wherein the control unit automatically permits, if the determination unit determines as determination result that the total number of the page element is one, the user to change the print setting information for the whole structured document, and
the control unit automatically permits, if the determination unit determines as a determination result that the total number of the page element is not one and there is no element to which the print setting information is attached in the layer of page elements, the user to change the print setting information for the whole structured document.

2. The document processing apparatus according to claim 1, wherein even if the print setting information is attached to a target element, it is determined by the first determination unit that the print setting information is not attached to the target element if the print setting information is blank.

3. The document processing apparatus according to claim 1, wherein the structured document is XML Paper Specification (XPS) data, and the print setting information is a print ticket.

4. The document processing apparatus according to claim 1, wherein, if it is determined that the total number of the page element is not one and there are elements to which the print setting information is attached in the layer of page elements, the determination unit further determines whether or not the same print setting information is attached to the elements,
wherein the control unit automatically permits, if the determination unit determines as determination result that the same print setting information is attached to the elements, the user to change the print setting information for the whole structured document, and
wherein the control unit automatically prohibits, if the determination unit determines as determination result that the same print setting information is not attached to the elements, the user to change the print setting information for the whole structured document.

5. A method for a document processing apparatus that handles a structured document comprising a layer of page element and a layer of document element including the page element, wherein print setting information are allowed to be attached to each element of the respective layers, the method comprising:

determining whether or not the print setting information is attached to each element of the layer of page element;

determining a total number of the page element and/or a total number of the document element; and automatically permitting a user to change the print setting information for the whole structured document or automatically prohibiting the user from changing the print setting information for the whole structured document based on the determinations, wherein the user is automatically permitted to change the print setting information for the whole structured document if it is determined that the total number of the page element is one, and the user is automatically permitted to change the print setting information for the whole structured document if it is determined that the total number of the page element is not one and there is no element to which the print setting information is attached in the layer of page elements.

6. The method according to claim 5, wherein even if the print setting information is attached to a target element, it is determined in the first determining that the print setting information is not attached to the target element if the print setting information is blank.

7. The method according to claim 5, wherein the structured document is XML Paper Specification (XPS) data, and the print setting information is a print ticket.

8. A non-transitory computer-readable storage medium storing a program for causing a computer to execute a method for a document processing apparatus that handles a structured document comprising a layer of page element and a layer of document element including the page element, wherein print setting information are allowed to be attached to each element of the respective layers, the method comprising:

determining whether or not the print setting information is attached to each element of the layer of page element;

determining a total number of the page element and/or a total number of the document element; and automatically permitting a user to change the print setting information for the whole structured document or automatically prohibiting the user from changing the print setting information for the whole structured document based on the determinations, wherein the user is automatically permitted to change the print setting information for the whole structured document if it is determined that the total number of the page element is one, and the user is automatically permitted to change the print setting information for the whole structured document if it is determined that the total number of the page element is not one and there is no element to which the print setting information is attached in the layer of page elements.

9. The non-transitory computer-readable storage medium according to claim 8, wherein even if the print setting information is attached to a target element, it is determined in the first determining that the print setting information is not attached to the target element if the print setting information is blank.

10. The non-transitory computer-readable storage medium according to claim 8, wherein the structured document is XML Paper Specification (XPS) data, and the print setting information is a print ticket.

\* \* \* \* \*